R. P. LAWTON.
Horse-Protectors.
No. 155,032. Patented Sept. 15, 1874.
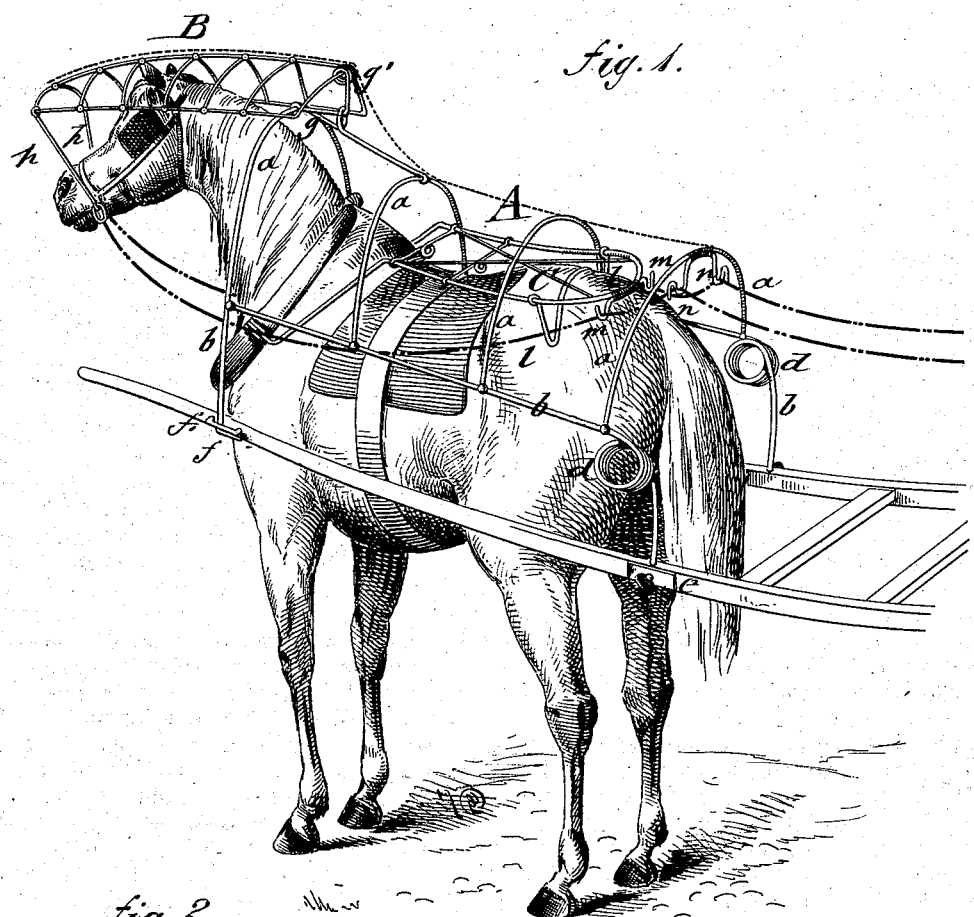
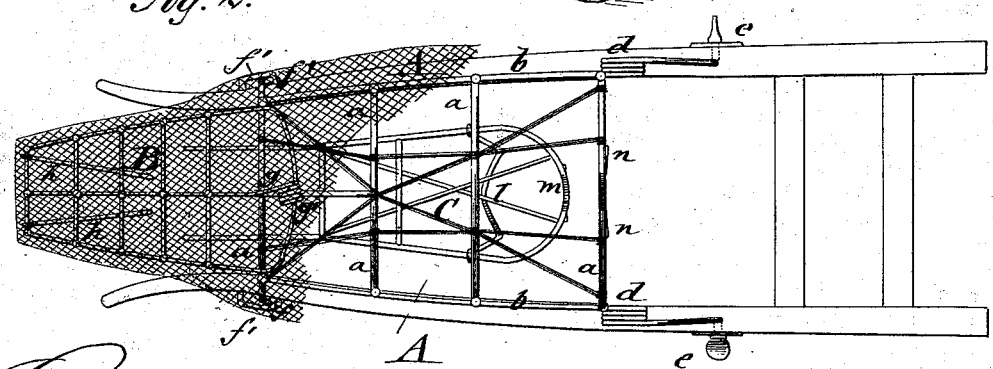

UNITED STATES PATENT OFFICE.

REUBEN P. LAWTON, OF ORAMEL, NEW YORK.

IMPROVEMENT IN HORSE-PROTECTORS.

Specification forming part of Letters Patent No. 155,032, dated September 15, 1874; application filed August 10, 1874.

*To all whom it may concern:*

Be it known that I, REUBEN P. LAWTON, of Oramel, in the county of Allegany and State of New York, have invented a new and Improved Horse-Protector, of which the following is a specification:

In the accompanying drawing, Figure 1 represents a perspective view of my improved horse-protecting device as applied to the thills, and Fig. 2 a top view of the same.

Similar letters of reference indicate corresponding parts.

The object of my invention is to so improve the horse-protectors carrying the net, blanket, or other article, that the head-piece of the same may be used in place of the check-rein, and be thrown out of the way on detaching it, while the body of the protector is so applied to the thills that the horse may be readily unhitched without being hindered thereby. The reins are furthermore guided and supported in such a manner that no entangling of the tail with the same is possible.

My invention consists in the spring connection of the head-piece with the main part or body of the protector, the spring support of the main part at the rear of the same, and suitable rein-supporting wires and hooks of the main part, and separate hip part for preventing the tail of the horse from getting over the lines.

In the drawing, A represents the main part or body of the horse-protector, which is constructed in the usual manner of lateral bent wires $a$, applied to longitudinal supporting-wires $b$. The net, blanket, or other article used for protecting the horse against flies, storms, or sun, &c., is placed over the main frame A, and supported by the same and suitable stiffening-wires, which are stretched to connect diagonally over the bent pieces $a$. The longitudinal supporting-pieces $b$ are bent at their rear ends into coiled springs $d$, and firmly attached by means of socket-slots and clamp-screws $e$ to the thills. The front ends of side pieces $b$ are bent under right angles toward the thills, and applied by end hooks $f$ to loops or staples $f'$ of thill. The action of the spiral springs $d$ carries instantly the main part A in upward direction, as soon as the front ends of the supporting pieces are detached from the thills, so that the horse can be unhitched without being interfered with by the supporting-frame. The head-piece B is attached to the upper part of the front wires $a$ in some suitable manner, the connecting-wire piece $g$ being provided with a spiral spring, $g'$, which has the tendency to throw the head-piece back on the body A unless connected to the bridle. Light wire rods $h$ connect the front part of head-piece B with the bridle, and take thereby the place of the check-rein for holding up the head of the horse. The spring connection of head-piece and body gives sufficient freedom to head of the horse, that this check arrangement is not onerous to the same. The reins are supported for the purpose of not getting entangled with the protector or tail on a separate wire-frame, C, which is also in yielding manner applied either to clamps of the harness or attached to the main part A. The reins first pass along a lateral V-shaped wire, $l$, of frame C, placed laterally across and resting on the back of the horse, then over rear guide-hooks $m$ of the same, and finally over hooks or eyes $n$ of the bent rear wire $a$ of the main frame A to the driver, who is thereby enabled to retain full control of the horse. The protector may be constructed of steel wire of sufficient lightness to form a neat and practical attachment to the thills.

For using the protector with a double team, in which case the thills are not available, it is necessary to support the same on a standard attached to the hip and back straps, the front ends being fastened into a slot or socket of the hames. The head-piece is applied in the same manner in both cases.

The horses are by this attachment fully protected, and the free circulation of air kept up around their bodies.

Having thus described my invention, I claim as new and desire to secure by Letters Patent—

1. As an improvement in horse-protectors, the main part or body A, provided at the side supporting-pieces $b$ with rear springs $d$, for throwing it in an upward direction when detached at the front ends, substantially as and for the purpose set forth.

2. The combination of head-piece B and spring connection $g$ $g'$, with the main part A, so that the head-piece may be thrown over the latter when detached, as set forth.

3. The combination of the head-piece B applied by spring connection to the main part A, and front connecting-rods $h$, with the bridle, for forming a substitute for the check-rein, substantially as specified.

4. The rein guiding and supporting devices, consisting of hip frame C, with lateral piece $e$ and hooks $m$, and the rear hooks $n$ of main frame A, for preventing the entangling of the lines, substantially as described.

REUBEN P. LAWTON.

Witnesses:
GEORGE R. BARBER,
WM. E. HAMMOND.